US012525386B2

(12) United States Patent
Yoshioka et al.

(10) Patent No.: US 12,525,386 B2
(45) Date of Patent: Jan. 13, 2026

(54) INDUCTOR COMPONENT

(71) Applicant: Murata Manufacturing Co., Ltd., Kyoto-fu (JP)

(72) Inventors: Yoshimasa Yoshioka, Nagaokakyo (JP); Yutaka Noguchi, Nagaokakyo (JP); Mari Yonemura, Nagaokakyo (JP); Kenichi Araki, Nagaokakyo (JP); Kouji Yamauchi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 726 days.

(21) Appl. No.: 17/932,733

(22) Filed: Sep. 16, 2022

(65) Prior Publication Data

US 2023/0086105 A1 Mar. 23, 2023

(30) Foreign Application Priority Data

Sep. 17, 2021 (JP) ................................. 2021-152375

(51) Int. Cl.

| | |
|---|---|
| ***H01F 27/28*** | (2006.01) |
| ***H01F 27/255*** | (2006.01) |
| ***H01F 27/29*** | (2006.01) |
| ***H01F 41/02*** | (2006.01) |
| ***H01F 41/04*** | (2006.01) |

(52) U.S. Cl.

CPC ........... *H01F 27/29* (2013.01); *H01F 27/255* (2013.01); *H01F 41/0246* (2013.01); *H01F 41/04* (2013.01)

(58) Field of Classification Search

CPC .... H01F 27/29; H01F 27/255; H01F 41/0246; H01F 41/04; H01F 17/04; H01F 41/046; H01F 2017/002; H01F 17/0013

USPC ......................................... 336/192, 200, 198

See application file for complete search history.

(56) References Cited

U.S. PATENT DOCUMENTS

| | | | | |
|---|---|---|---|---|
| 2003/0134612 | A1* | 7/2003 | Nakayama | H01F 17/0013 455/306 |
| 2007/0296536 | A1* | 12/2007 | Odahara | H01F 17/0013 336/200 |
| 2010/0328009 | A1* | 12/2010 | Tawa | H01F 17/0013 336/200 |
| 2017/0103848 | A1* | 4/2017 | Yoneda | H01F 17/0013 |
| 2017/0256352 | A1* | 9/2017 | Kido | H01F 27/2804 |
| 2021/0118602 | A1* | 4/2021 | Tsuchiya | H01F 41/0246 |

FOREIGN PATENT DOCUMENTS

| | | |
|---|---|---|
| JP | 2004-221474 A | 8/2004 |
| JP | 2021-19093 A | 2/2021 |

* cited by examiner

*Primary Examiner* — Shawki S Ismail
*Assistant Examiner* — Kazi S Hossain
(74) *Attorney, Agent, or Firm* — Studebaker Brackett PLLC

(57) ABSTRACT

An inductor component includes an element body, a coil, and a first outer electrode and a second outer electrode, in which the coil includes a coil wiring, a first extended wiring, and a second extended wiring. The first extended wiring includes a first connection surface connected to the coil wiring and a second connection surface connected to the first outer electrode, and a first straight line connecting the first connection surface and the second connection surface is inclined to the direction orthogonal to the first main surface.

21 Claims, 14 Drawing Sheets

INDUCTOR COMPONENT

CROSS-REFERENCE TO RELATED APPLICATION

This application claims benefit of priority to Japanese Patent Application No. 2021-152375, filed Sep. 17, 2021, the entire content of which is incorporated herein by reference.

BACKGROUND

Technical Field

The present disclosure relates to an inductor component.

Background Art

An inductor component is described in Japanese Unexamined Patent Application Publication No. 2004-221474. The inductor component includes a first core and a second core made of a magnetic material, and a flat coil that has a turn count of one turn or less and is U-shaped or channel-shaped, and the first core and the second core are butted against each other with the coil accommodated therebetween. Both ends of the coil are formed into an L shape to form terminals, and are fitted into notches in the second core.

SUMMARY

However, it has been found that the aforementioned inductor component has a problem of low inductance acquisition efficiency. The inventor of the present application, after diligent studies, has identified the following cause for this problem.

In the inductor component, both ends of the coil are orthogonal to the U-shaped or channel-shaped main body portion of the coil. That is, both ends of the coil are orthogonal to a first main surface of the second core, and the main body portion of the coil is disposed closer to a second main surface of the first core. This generates a region on the first main surface side of the first core in which the magnetic flux density of the coil is low and the coil is not effectively used, resulting in low inductance acquisition efficiency.

The present disclosure provides an inductor component capable of improving the inductance acquisition efficiency.

In an embodiment of the present disclosure, an inductor component according to an aspect of the present disclosure includes an element body containing a magnetic material and having a first main surface and a second main surface, a coil provided in the element body and wound along an axis, and a first outer electrode and a second outer electrode provided on the element body and electrically connected to the coil. The coil includes a coil wiring formed of a single layer with less than one turn extending in a direction parallel to the first main surface, a first extended wiring disposed in a layer different from the coil wiring, connected to a first end portion of the coil wiring, extended toward the first main surface or the second main surface, and connected to a first outer electrode, and a second extended wiring disposed in a layer different from the coil wiring, connected to a second end portion of the coil wiring, extended toward the first main surface or the second main surface, and connected to the second outer electrode. The first extended wiring includes only one extended wiring layer extending in the direction parallel to the first main surface or a plurality of extended wiring layers disposed in different layers and electrically connected in series with each other and extending in the direction parallel to the first main surface. When viewed in a direction orthogonal to the first main surface, a length of a center line of the coil wiring is longer than a length of a center line of any of the extended wiring layers and all the extended wiring layers have less than one turn. The first extended wiring includes a first connection surface connected to the coil wiring and a second connection surface connected to the first outer electrode, and a first straight line connecting the first connection surface and the second connection surface is inclined to the direction orthogonal to the first main surface.

Here, the "layers" extend in the direction parallel to the first main surface and are laminated in the direction orthogonal to the first main surface. The "center line of the coil wiring" is a line extending in an extending direction of the coil wiring and passing through a center of a cross section of the coil wiring. The "center line of the extended wiring layer" is a line extending in an extending direction of the extended wiring layer and passing through a center of a cross section of the extended wiring layer.

The term "less than one turn" refers to a state in which the coil wiring and the first and second extended wirings of the coil have no portions running in parallel in a winding direction adjacent to each other in the radial direction when viewed in the axial direction in a cross section orthogonal to the axis. The term "one turn or more" refers to a state in which the wiring of the coil has portions running in parallel in the winding direction adjacent to each other in the radial direction when viewed in the axial direction in the cross section orthogonal to the axis. Note that the portions running in parallel of the wiring include not only the extending portion extending in the winding direction of the wiring but also a pad portion connected to end portion of the extending portion and having width larger than the width of the extending portion.

The first straight line being inclined to the direction orthogonal to the first main surface specifically means that the first straight line is inclined to a perpendicular line orthogonal to the first main surface and passes through the second connection surface. However, the inclination does not include the inclination of the manufacturing variation level. Specifically, the inclination does not include a minute difference in angle that occurs when the first main surface and the second main surface are not strictly parallel to each other, and a minute difference in angle that occurs when the first main surface and the axis of the coil are not strictly orthogonal to each other.

According to the embodiment, the first straight line is inclined to the direction orthogonal to the first main surface, so that the magnetic flux density of the coil can be brought close to even in the entire element body, and a region in which the magnetic flux density of the coil is low and is not effectively used (hereinafter, also referred to as a low magnetic flux density region) can be reduced, thereby improving the inductance acquisition efficiency.

Preferably, in an embodiment of the inductor component, the number of turns of the coil wiring is larger than the number of turns of any of the extended wiring layers.

According to the embodiment, the inductance acquisition efficiency can be improved by making the number of turns the largest in the coil wiring having the maximum length.

Preferably, in an embodiment of the inductor component, the first straight line passes through an inside of the first extended wiring.

According to the embodiment, when the first extended wiring is constituted of a plurality of extended wiring layers, a contact area between extended wiring layers adjacent to each other is large, resulting in good connectivity between the extended wiring layers adjacent to each other. To be precise, a plurality of first straight lines can be drawn depending on which point on the first connection surface and which point on the second connection surface are connected to each other, but it is sufficient that at least one of the plurality of first straight lines passes through the inside of the first extended wiring over the entirety thereof.

Preferably, in an embodiment of the inductor component, an inclination angle of the first straight line to the direction orthogonal to the first main surface is 10° to 45°.

Here, the inclination angle of the first straight line is 0° when the first straight line is parallel to the direction orthogonal to the first main surface. Again, to be precise, a plurality of first straight lines can be drawn depending on which point on the first connection surface and which point on the second connection surface are connected to each other, but it is sufficient that at least one of the plurality of first straight lines has an inclination angle of 10° to 45°.

According to the embodiment, the low magnetic flux density region of the element body is further reduced, and the connectivity between the extended wiring layers adjacent to each other is improved.

Preferably, in an embodiment of the inductor component, the element body contains magnetic metal powder of FeSi alloy, a particle size D50 of the magnetic metal powder is 10 μm or less, and a particle size D90 of the magnetic metal powder is 15 μm or less.

According to the embodiment, the filling properties of the magnetic metal powder can be improved. In addition, since the magnetic metal powder contains Fe elements, it is excellent in direct current superposition characteristics, and since the particle size of the magnetic metal powder is small, it is excellent in high-frequency characteristics.

Preferably, in an embodiment of the inductor component, a length of the first straight line is at least five times a thickness of the coil wiring.

According to the embodiment, the wiring length of the first extended wiring is increased, thereby further reducing the low magnetic flux density region of the element body.

Preferably, in an embodiment of the inductor component, a porosity of the coil wiring is smaller than a porosity of the element body.

According to the embodiment, since the porosity of the coil wiring is small, the direct current resistance of the coil wiring can be reduced. Further, since the porosity of the element body is larger than the porosity of the coil wiring, residual stress due to a difference in linear expansion between the element body and the coil wiring can be absorbed by the element body. At this time, since a volume of the element body is larger than a volume of the coil wiring, deformation of the inductor component due to thermal stress can be reduced.

Preferably, in an embodiment of the inductor component, a porosity of the coil wiring is larger than a porosity of the element body.

According to the embodiment, since the porosity of the element body is small, the strength of the element body can be increased, and the effective magnetic permeability can be increased. In addition, since the porosity of the coil wiring is larger than the porosity of the element body, residual stress due to a difference in linear expansion between the element body and the coil wiring can be absorbed by the coil wiring.

Preferably, in an embodiment of the inductor component, each of the first outer electrode and the second outer electrode is provided only on the first main surface or the second main surface, and is constituted of a plurality of conductive layers.

According to the embodiment, since each of the first outer electrode and the second outer electrode is provided only at the first main surface or only at the second main surface, the interference of the magnetic flux by the first outer electrode and the second outer electrode is suppressed, thereby improving the inductance acquisition efficiency. In addition, since each of the first outer electrode and the second outer electrode is constituted of the plurality of conductive layers, the conductive layers can each have desired functions.

Preferably, in an embodiment of the inductor component, the first extended wiring and the second extended wiring are in direct contact with the element body.

According to the embodiment, since a volume of the element body can be increased, the filling amount of the magnetic material can be increased, thereby improving the inductance acquisition efficiency.

Preferably, in an embodiment of the inductor component, the coil wiring has a plurality of outer surfaces, and at least one surface of the plurality of outer surfaces is covered with an organic insulating resin.

According to the embodiment, the insulation properties of the coil wiring can be improved.

Preferably, in an embodiment of the inductor component, the coil wiring, the first extended wiring, and the second extended wiring each have parallel surfaces parallel to the first main surface, and at least one parallel surface of the parallel surfaces of the coil wiring, the first extended wiring, and the second extended wiring is covered with an insulating layer having a higher insulation resistance than the magnetic material of the element body.

According to the embodiment, a short circuit between the wirings in the direction orthogonal to the first main surface can be suppressed, thereby improving direct current superposition.

Preferably, in an embodiment of the inductor component, the second extended wiring includes a third connection surface connected to the coil wiring and a fourth connection surface connected to the second outer electrode, and a second straight line connecting the third connection surface and the fourth connection surface is inclined to the direction orthogonal to the first main surface.

According to the embodiment, a low magnetic flux density region of the element body can be further reduced, thereby further improving the inductance acquisition efficiency.

Preferably, in an embodiment of the inductor component, the first extended wiring includes via layers connected to both ends of the extended wiring layer and extending in the direction orthogonal to the first main surface.

According to the embodiment, since heights of the via layers can be adjusted, the inductor component can be adjusted to any desired thickness.

Preferably, in an embodiment of the inductor component, thicknesses of the via layers are thinner than the thickness of the coil wiring and a thickness of the extended wiring layer.

According to the embodiment, since the thicknesses of the via layers are thin, the coil length can be shortened, thereby improving the inductance acquisition efficiency.

Preferably, in an embodiment of the inductor component, when viewed in the direction orthogonal to the first main surface, the first straight line and the second straight line are axisymmetric with respect to a center line passing through a center of the element body.

According to the embodiment, when viewed in the direction orthogonal to the first main surface, the coil can be symmetrical with respect to the center line of the element body, thereby reducing the influence of leakage flux.

Preferably, in an embodiment of the inductor component, the extended wiring layer of the first extended wiring is directly connected to at least one member of the coil wiring and the first outer electrode.

According to the embodiment, since a via layer is not provided for connecting the extended wiring layer and the member, the thickness of the inductor component can be reduced.

Preferably, in an embodiment of the inductor component, an overlap length in the direction orthogonal to the first main surface between the extended wiring layer and the member directly connected to each other is 1/10 or less of a thickness of the extended wiring layer.

According to the embodiment, since the overlap length between the extended wiring layer and the member is small, a distance in the direction orthogonal to the first main surface between the member and another extended wiring layer, which is not directly connected to the member, can be secured, thereby preventing a short circuit between the member and the other extended wiring layer.

Preferably, in an embodiment of the inductor component, the first extended wiring includes the plurality of extended wiring layers, and when viewed in the direction orthogonal to the first main surface, the plurality of extended wiring layers do not overlap except for end portions directly or indirectly connected in extended wiring layers adjacent to each other in the direction orthogonal to the first main surface.

According to the embodiment, since the plurality of extended wiring layers do not overlap except for the connection end portions of the extended wiring layers adjacent to each other in the direction orthogonal to the first main surface, the region of the extended wiring layer can be reduced and the region of the magnetic material can be increased, thereby improving the inductance acquisition efficiency and the direct current superposition characteristics.

According to the inductor component of one aspect of the present disclosure, it is possible to improve the inductance acquisition efficiency.

DETAILED DESCRIPTION

Figure 1:
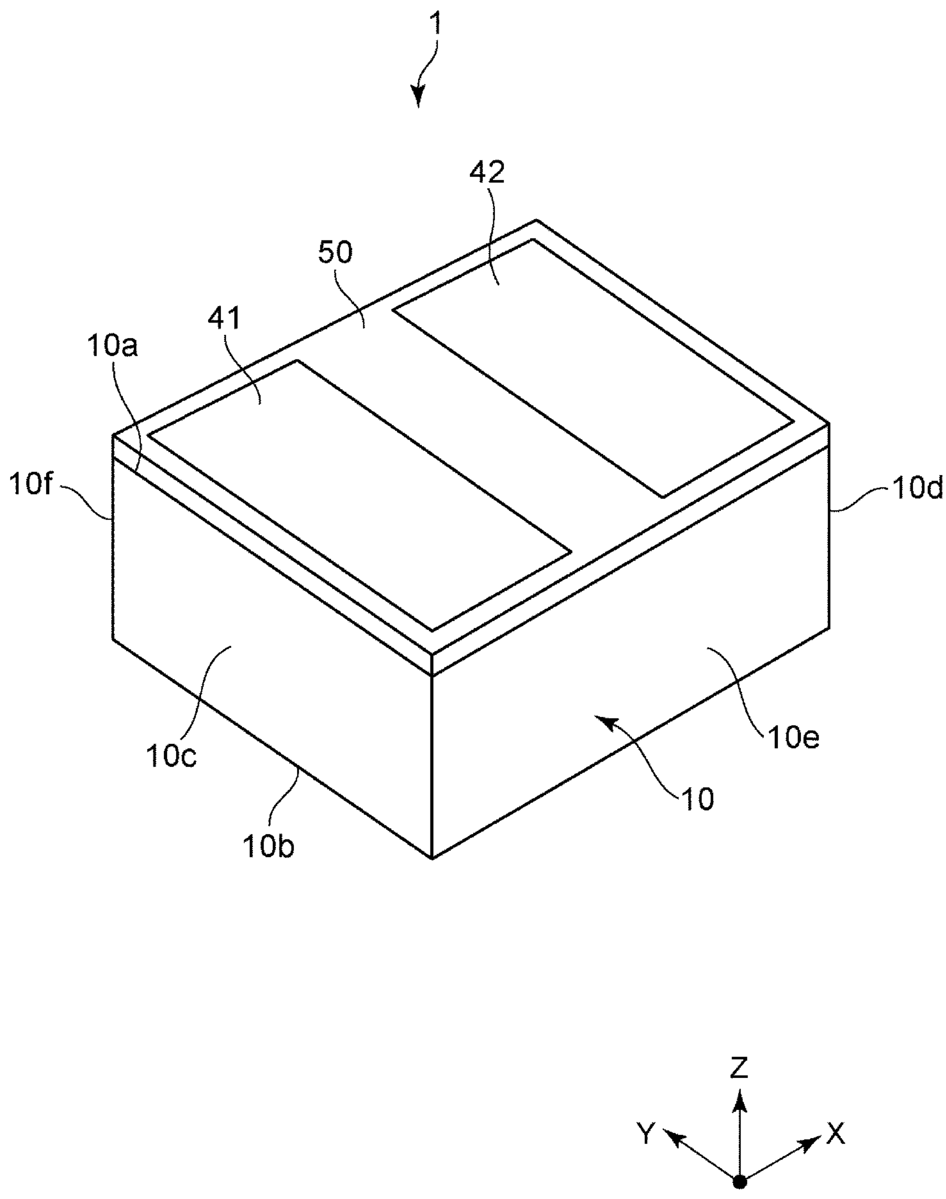
FIG. 1 is a perspective view illustrating a first embodiment of an inductor component.

Hereinafter, an inductor component according to an aspect of the present disclosure will be described in detail with reference to embodiments illustrated in the drawings. Note that some of the drawings are schematic and do not reflect actual dimensions and ratios in some cases.

First Embodiment

Configuration

Figure 2:
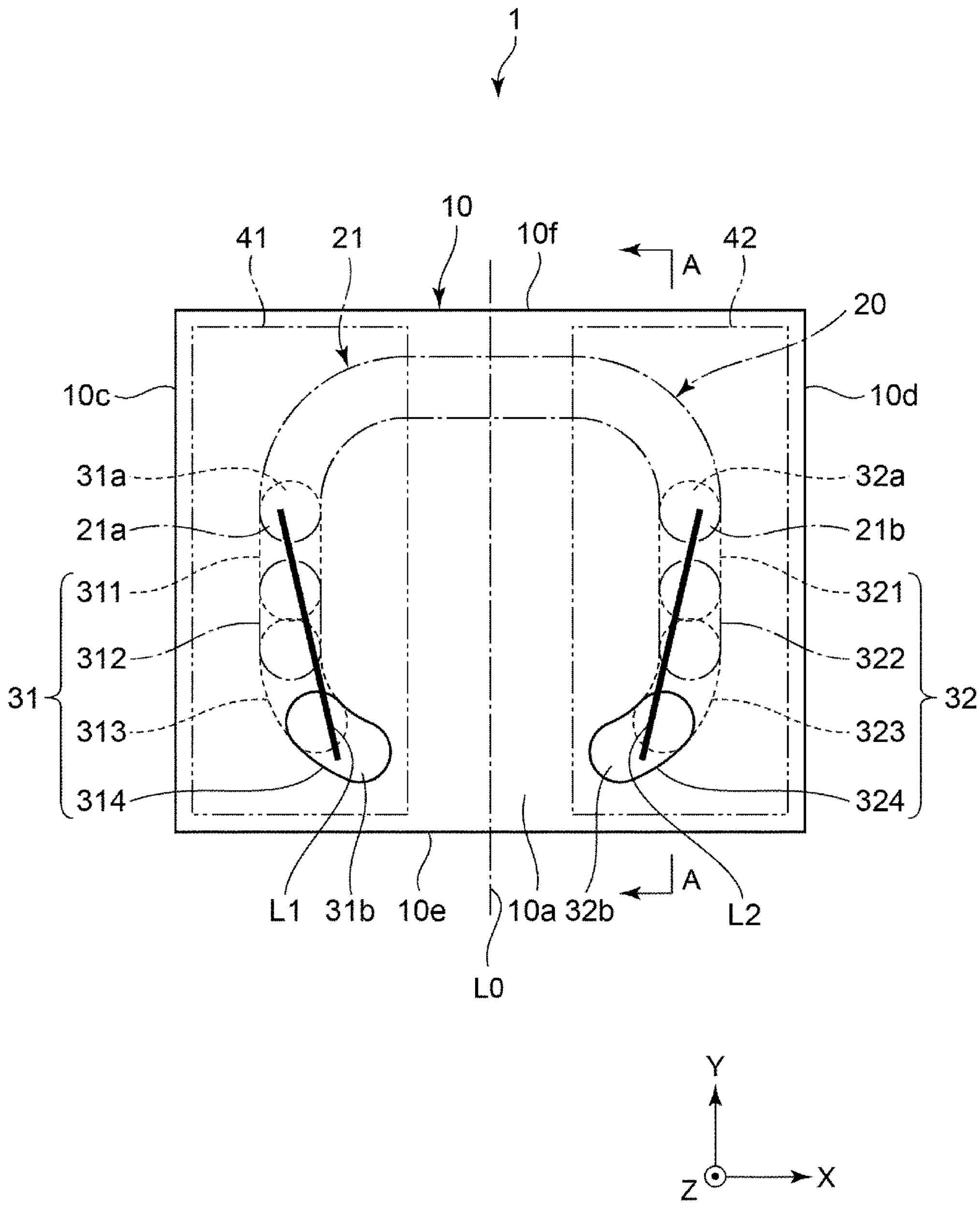
FIG. 2 is a plan view of the inductor component.
Figure 3:
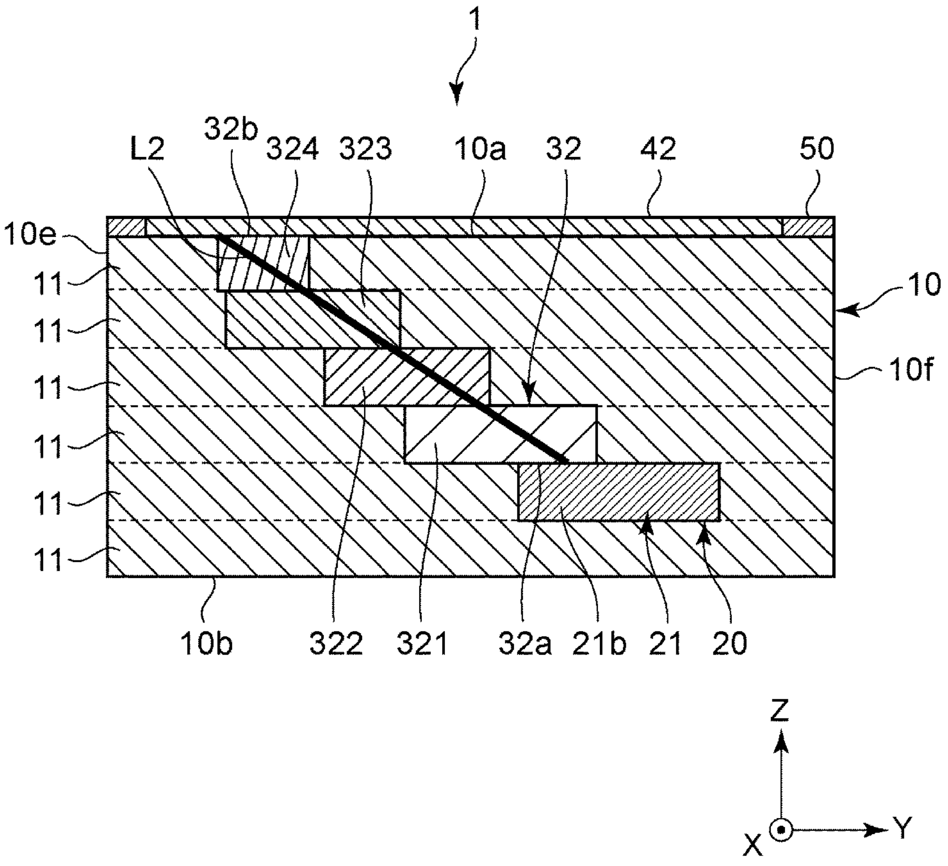
FIG. 3 is a cross-sectional view taken along line A-A in FIG. 2.
Figure 4:
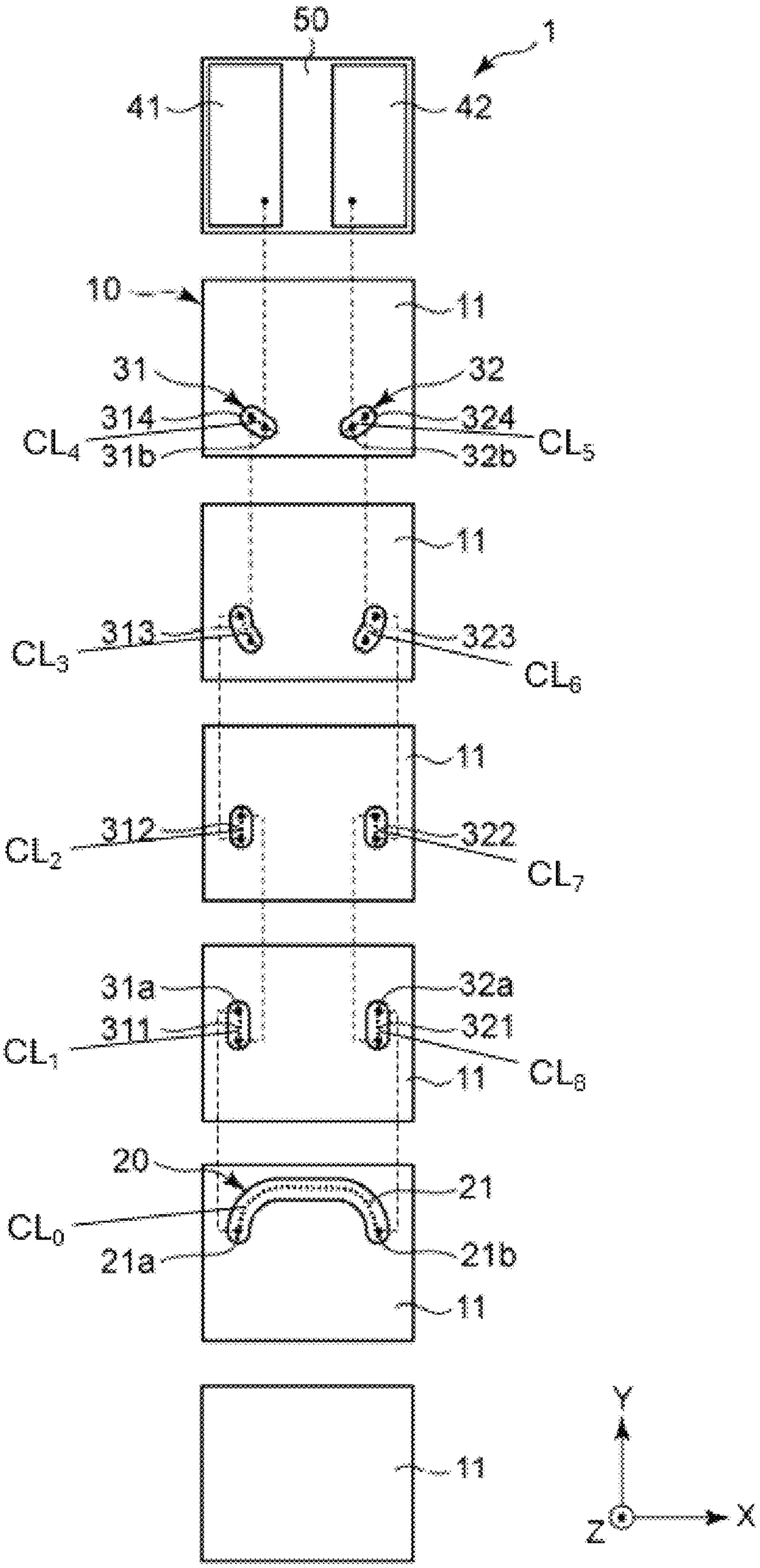
FIG. 4 is an exploded plan view of the inductor component.

FIG. 1 is a perspective view illustrating a first embodiment of an inductor component. FIG. 2 is a plan view of the inductor component. FIG. 3 is a cross-sectional view taken along line A-A in FIG. 2. FIG. 4 is an exploded plan view of the inductor component.

An inductor component 1 is used in electronic devices such as personal computers, DVD players, digital cameras, TVs, mobile phones, and car electronics, and is, for example, a component having a rectangular parallelepiped shape as a whole. However, the shape of the inductor component 1 is not limited to a specific shape, and may be a cylindrical shape, a polygonal columnar shape, a truncated cone shape, or a truncated polygonal pyramid shape.

As illustrated in FIGS. 1, 2, 3, and 4, the inductor component 1 includes an element body 10, a coil 20 provided in the element body 10 and wound along an axis, a first outer electrode 41 and a second outer electrode 42 provided in the element body 10 and electrically connected to the coil 20, and an insulating film 50 provided on a first main surface 10*a* of the element body 10. In FIG. 2, for convenience, the first outer electrode 41 and the second outer electrode 42 are indicated by a long dashed double-short dashed line, and the insulating film 50 is omitted.

In the drawings, a thickness direction of the inductor component 1 is defined as a Z direction, and a forward Z direction is defined as an upper side and a reverse Z direction is defined as a lower side. In a plane orthogonal to the Z direction of the inductor component 1, a length direction, which is a longitudinal direction of the inductor component 1 and is a direction in which the first outer electrode 41 and the second outer electrode 42 are aligned, is defined as an X direction, and a width direction of the inductor component 1, which is a direction orthogonal to the length direction, is defined as a Y direction.

The element body 10 has the first main surface 10*a* and a second main surface 10*b*, and a first side surface 10*c*, a second side surface 10*d*, a third side surface 10*e*, and a fourth side surface 10*f* that are located between the first main surface 10*a* and the second main surface 10*b* and connect the first main surface 10*a* and the second main surface 10*b*.

The first main surface 10*a* and the second main surface 10*b* are disposed opposite to each other in the Z direction, the first main surface 10*a* is disposed in the forward Z direction, and the second main surface 10*b* is disposed in the reverse Z direction. The first side surface 10*c* and the second side surface 10*d* are disposed opposite to each other in the X direction, the first side surface 10*c* is disposed in the reverse X direction, and the second side surface 10*d* is disposed in the forward X direction. The third side surface 10*e* and the fourth side surface 10*f* are disposed opposite to each other in the Y direction, the third side surface 10*e* is disposed in the reverse Y direction, and the fourth side surface 10*f* is disposed in the forward Y direction.

The element body 10 includes a plurality of magnetic layers 11 laminated along the forward Z direction. The magnetic layer 11 contains magnetic materials, for example, magnetic metal powder and a resin containing the magnetic powder. The resin is an organic insulating material made of, for example, an epoxy-based resin, a phenol-based resin, a liquid crystal polymer-based resin, a polyimide-based resin, an acrylic-based resin, or a mixture thereof. The magnetic powder is, for example, an FeSi alloy such as FeSiCr, an FeCo alloy, an Fe alloy such as NiFe, or an amorphous alloy thereof. Therefore, in comparison with a magnetic layer made of ferrite, the magnetic powder can improve the direct current superposition characteristics, and the resin can insulate the magnetic powders, thereby reducing loss (iron loss) at high frequencies. A magnetic layer made of ferrite may be used for the element body. The magnetic layer is not limited to a layer containing a resin, and may be a sintered body of magnetic metal powder or ferrite powder.

The first outer electrode 41 and the second outer electrode 42 are provided on the first main surface 10*a* of the element body 10. The first outer electrode 41 and the second outer electrode 42 are made of conductive materials, and have a three-layer configuration in which, for example, Cu having low electrical resistance and excellent stress resistance, Ni having excellent corrosion resistance, and Au having excellent solder wettability and reliability are arranged in this order from the inside to the outside.

The first outer electrode 41 is in contact with a first end portion of the coil 20 exposed out of the first main surface 10*a* of the element body 10, and is electrically connected to the first end portion of the coil 20. The second outer electrode 42 is in contact with a second end portion of the coil 20 exposed out of the first main surface 10*a* of the element body 10, and is electrically connected to the second end portion of the coil 20. At least part of the first outer electrode 41 and the second outer electrode 42 may be embedded in the element body 10.

The insulating film 50 is provided on a portion of the first main surface 10*a* of the element body 10 where the first outer electrode 41 and the second outer electrode 42 are not provided. The insulating film 50 is made of a resin material having high electrical insulating properties such as an acrylic resin, an epoxy resin, or a polyimide resin. This can improve insulation between the first outer electrode 41 and the second outer electrode 42. In addition, the insulating film 50 serves as a mask for the patterning of the first outer electrode 41 and the second outer electrode 42, thereby improving manufacturing efficiency. Further, when the magnetic powder is exposed out of the resin, the insulating film 50 can cover the exposed magnetic powder, thereby preventing the magnetic powder from being exposed to the outside. The insulating film 50 may contain fillers made of a non-magnetic insulating material.

The coil 20 is wound along an axis parallel to the Z direction. The coil 20 has less than one turn. The coil 20 is made of a conductive material such as Ag or Cu. A thickness of the coil 20 is preferably, for example, 40 μm to 120 μm.

The coil 20 includes a coil wiring 21, a first extended wiring 31, and a second extended wiring 32. The coil wiring 21 is formed of a single layer with less than one turn extending in a direction parallel to the first main surface 10*a*. That is, the coil wiring 21 is formed of a single coil conductive layer extending in the direction parallel to the first main surface 10*a*.

The first extended wiring 31 is disposed in a layer different from the layer of the coil wiring 21. Specifically, the first extended wiring 31 is disposed in an upper layer of the coil wiring 21. The first extended wiring 31 is connected to a first end portion 21*a* of the coil wiring 21, and is extended toward the first main surface 10*a* and connected to the first outer electrode 41.

The second extended wiring 32 is disposed in a layer different from the layer of the coil wiring 21. Specifically, the second extended wiring 32 is disposed in an upper layer of the coil wiring 21, and is disposed in the same layer as the first extended wiring 31. The second extended wiring 32 is connected to a second end portion 21*b* of the coil wiring 21, and is extended toward the first main surface 10*a* and connected to the second outer electrode 42.

The first extended wiring 31 includes a first extended wiring layer 311, a second extended wiring layer 312, a third extended wiring layer 313, and a fourth extended wiring layer 314. Thus, since the first extended wiring 31 is constituted of a plurality of extended wiring layers, the degree of freedom of the first extended wiring 31 is high. The first extended wiring layer 311, the second extended wiring layer 312, the third extended wiring layer 313, and the fourth extended wiring layer 314 each extend in the direction parallel to the first main surface 10*a* and are disposed in different layers from each other. Specifically, the first extended wiring layer 311, the second extended wiring layer 312, the third extended wiring layer 313, and the fourth extended wiring layer 314 are sequentially laminated in the Z direction, and are electrically connected to each other in series in this order.

The second extended wiring 32 includes a first extended wiring layer 321, a second extended wiring layer 322, a third extended wiring layer 323, and a fourth extended wiring layer 324. Thus, since the second extended wiring 32 is constituted of a plurality of extended wiring layers, the degree of freedom of the second extended wiring 32 is high. The first extended wiring layer 321, the second extended wiring layer 322, the third extended wiring layer 323, and the fourth extended wiring layer 324 each extend in the direction parallel to the first main surface 10*a* and are disposed in different layers from each other. Specifically, the first extended wiring layer 321, the second extended wiring layer 322, the third extended wiring layer 323, and the fourth extended wiring layer 324 are sequentially laminated in the Z direction, and are electrically connected to each other in series in this order. The first extended wiring layer 321 is disposed in the same layer as the first extended wiring layer 311, the second extended wiring layer 322 is disposed in the same layer as the second extended wiring layer 312, the third extended wiring layer 323 is disposed in the same layer as the third extended wiring layer 313, and the fourth extended wiring layer 324 is disposed in the same layer as the fourth extended wiring layer 314.

When viewed in a direction orthogonal to the first main surface 10*a*, all the extended wiring layers 311 to 314 and 321 to 324 have less than one turn. The direction orthogonal to the first main surface 10*a* is a direction parallel to the Z direction. When viewed in the direction orthogonal to the first main surface 10*a*, a length of a center line $CL_0$ of the coil wiring 21 is longer than a length of a center line (e.g., $C_{L1}$, $CL_2$, . . . , or $CL_8$) of any of the extended wiring layers 311 to 314 and 321 to 324, as shown in FIG. 4. Thus, by increasing the wiring length of the coil wiring 21, the inductance acquisition efficiency can be increased.

The first extended wiring 31 includes a first connection surface 31*a* connected to the first end portion 21*a* of the coil wiring 21 and a second connection surface 31*b* connected to the first outer electrode 41. A first straight line L1 connecting the first connection surface 31*a* and the second connection surface 31*b* is inclined to the direction orthogonal to the first main surface 10*a*. The second extended wiring 32 includes a third connection surface 32*a* connected to the second end portion 21*b* of the coil wiring 21 and a fourth connection surface 32*b* connected to the second outer electrode 42. A second straight line L2 connecting the third connection surface 32*a* and the fourth connection surface 32*b* is inclined to the direction orthogonal to the first main surface 10*a*.

According to the above configuration, the first straight line L1 and the second straight line L2 are inclined to the direction orthogonal to the first main surface 10*a*, so that the magnetic flux density of the coil 20 can be brought close to even in the entire element body 10, and a region in which the magnetic flux density of the coil 20 is low and is not effectively used (hereinafter, also referred to as a low magnetic flux density region) can be reduced, thereby improving the inductance acquisition efficiency. In addition, since the numbers of turns of the coil wiring 21 and all the extended wiring layers 311 to 314 and 321 to 324 are less than one turn, the concentration of the magnetic flux in the inner magnetic path portion of the coil 20 can be reduced, thereby improving the direct current superposition. Further, since the number of turns of the coil 20 is small, the direct current resistance can be reduced.

The first outer electrode 41 may be provided on the second main surface 10*b*. In this case, the first extended wiring 31 is extended toward the second main surface 10*b*. Also, the second outer electrode 42 may be provided on the second main surface 10*b*. In this case, the second extended wiring 32 is extended toward the second main surface 10*b*.

Preferably, as illustrated in FIG. 2, the number of turns of the coil wiring 21 is larger than the number of turns of any one of the extended wiring layers 311 to 314 and 321 to 324. According to the above configuration, in the coil wiring 21 having the longest length, the number of turns is also the largest, thereby improving the inductance acquisition efficiency.

Preferably, as illustrated in FIGS. 2 and 3, the second straight line L2 passes through the inside of the second extended wiring 32. To be specific, the second straight line L2 passes through the inside of an outer surface of the second extended wiring 32, and passes through the insides of the first extended wiring layer 321, the second extended wiring layer 322, the third extended wiring layer 323, and the fourth extended wiring layer 324. According to the above configuration, a contact area between the extended wiring layers adjacent to each other in the Z direction can be increased, thereby improving the connectivity between the extended wiring layers adjacent to each other.

Preferably, as illustrated in FIG. 2, the first straight line L1 passes through the inside of the first extended wiring 31, and the same effect as the above-described effect is obtained.

Preferably, an inclination angle of the first straight line L1 to the direction orthogonal to the first main surface 10*a* is 10° to 45°. The inclination angle when the first straight line L1 is parallel to the direction orthogonal to the first main surface 10*a* is 0°. According to the above configuration, the low magnetic flux density region of the element body 10 is further reduced, and the connectivity between the extended wiring layers adjacent to each other is improved.

On the other hand, when the inclination angle of the first straight line L1 is less than 10°, the first straight line L1 is substantially orthogonal to the first main surface 10*a*, and the ratio at which the low magnetic flux density region of the element body 10 can be reduced decreases. When the inclination angle of the first straight line L1 is larger than 45°, the contact area of the extended wiring layers adjacent to each other are reduced, or the amount of the magnetic material is relatively reduced because the amount of the extended wiring layers is increased in order to secure the contact area of the extended wiring layers adjacent to each other.

Preferably, the inclination angle of the second straight line L2 is 10° to 45°, and the same effect as the above-described effect is obtained.

Preferably, the element body 10 contains magnetic metal powder of FeSi alloy, a particle size D50 of the magnetic metal powder is 10 μm or less, and a particle size D90 of the magnetic metal powder is 15 μm or less. According to the above configuration, the filling properties of the magnetic metal powder can be improved. In addition, since the magnetic metal powder contains Fe elements, it is excellent in direct current superposition, and since the particle size of the magnetic metal powder is small, it is excellent in high-frequency characteristics. In addition, from a manufacturing method point of view, when the particle size D50 or the D90 is large, the magnetic powder is clogged in the mesh during printing, resulting in poor printing properties (pattern properties) and insufficient magnetic powder filling. Thus, it is preferable to select magnetic powder having D50 smaller than the mesh hole. Further, it is preferable that D90 is smaller than the mesh hole.

Here, unless otherwise specified, the particle size D50 of the magnetic metal powder is measured from a scanning electron microscope (SEM) image of a cross section of a central portion in the longitudinal direction of the element body 10 of the inductor component. At this time, the SEM image preferably contains 10 or more magnetic powders, and is acquired at a magnification of, for example, 2000 times. The SEM images as described above are acquired at three or more positions from the cross section, the magnetic powder and others are classified by binarization or the like, the equivalent circle diameters of the magnetic powders in the SEM images are calculated, and an intermediate value (median size) when arranged in order of the equivalent circle diameter size is defined as D50 of the particle size of the magnetic powder. In addition, the number of particles is accumulated in ascending order of the equivalent circle diameter, and the equivalent circle diameter when the number exceeds 90% of the total for the first time is defined as D90 of the particle size of the magnetic powder.

Preferably, a length of the first straight line L1 is at least five times a thickness of the coil wiring 21. According to the above configuration, the wiring length of the first extended wiring 31 is increased, thereby further reducing the low magnetic flux density region of the element body 10.

Preferably, a length of the second straight line L2 is at least five times the thickness of the coil wiring 21, and the same effects as the above-described effect is obtained.

Preferably, a porosity of the coil wiring 21 is smaller than a porosity of the element body 10. According to the above configuration, since the porosity of the coil wiring 21 is small, the direct current resistance of the coil wiring 21 can be reduced. Further, since the porosity of the element body 10 is larger than the porosity of the coil wiring 21, residual stress due to a difference in linear expansion between the element body 10 and the coil wiring 21 can be absorbed by the element body 10. At this time, since a volume of the element body 10 is larger than a volume of the coil wiring 21, deformation of the inductor component due to thermal stress can be reduced.

For example, the coil wiring 21 is made of a conductive paste and is formed by a printing method. Here, by sintering the conductive paste, the conductive materials in the conductive paste are integrated. Examples of the conductive material include Ag and Cu. As the coil wiring 21, other than the conductive paste, electrolytic plating, electroless plating, sputtering, or the like may be used as necessary.

The porosity of the coil wiring 21 is preferably 5% or less, and more preferably 1.5% or less. When the porosity is 1.5% or less, even when an Ag conductive paste is used, it is possible to obtain a resistivity close to that of electroplated copper having very high purity. The porosity of the element body 10 is preferably 5% or less, and more preferably 1% or less. For example, the porosity of the coil wiring 21 may be 1.5%, and the porosity of the element body 10 may be 2.8%.

Here, the porosity is calculated from an average value of five points in the SEM image acquired at a magnification of 2000 times. Note that the magnification may be changed depending on structure, material, or the like. For example, when calculating the porosity of the coil wiring, the magnification may be a magnification at which the smaller of the thickness and width of the coil wiring fits in the angle of view, and when calculating the porosity of the element body, the magnification may be a magnification at which 10 or more magnetic powders fit in the angle of view.

Alternatively, the porosity of the coil wiring 21 is larger than the porosity of the element body 10. According to the above configuration, since the porosity of the element body 10 is small, the strength of the element body 10 can be increased and the effective magnetic permeability can be increased. In addition, since the porosity of the coil wiring 21 is larger than the porosity of the element body 10, residual stress due to a difference in linear expansion between the element body 10 and the coil wiring 21 can be absorbed by the coil wiring 21. For example, the porosity of the coil wiring 21 may be 1.5%, and the porosity of the element body 10 may be 0.5%.

Preferably, each of the first outer electrode 41 and the second outer electrode 42 is provided only on the first main surface 10*a* or the second main surface 10*b*, and is constituted of a plurality of conductive layers. In other words, neither the first outer electrode 41 nor the second outer electrode 42 is provided on any of the first side surface 10*c*, the second side surface 10*d*, the third side surface 10*e*, and the fourth side surface 10*f*. According to the above configuration, since each of the first outer electrode 41 and the second outer electrode 42 is provided only on the first main surface 10*a* or the second main surface 10*b*, it is possible to suppress obstruction of magnetic fluxes by the first outer electrode 41 and the second outer electrode 42, thereby improving the inductance acquisition efficiency. In addition, since each of the first outer electrode 41 and the second outer electrode 42 is constituted of the plurality of conductive layers, the conductive layers can each have desired functions.

Specifically, the configuration of the conductive layers of each of the first outer electrode 41 and the second outer electrode 42 is, for example, Ag/Ni/Sn, Cu/Ni/Au, Ni/Pd/Au, Cu/Ni/Sn, or the like. Ag and Cu are excellent in ensuring connectivity between the extended wiring and the external terminal. Ni and Pd function as a barrier layer against electrochemical migration or the like, and Au and Sn can provide solder wettability.

Preferably, the first extended wiring 31 and the second extended wiring 32 are in direct contact with the element body 10. According to the above configuration, since a volume of the element body 10 can be increased, the filling amount of the magnetic material can be increased, thereby improving the inductance acquisition efficiency.

Preferably, as illustrated in FIG. 2, when viewed in the direction orthogonal to the first main surface 10*a*, the first straight line L1 and the second straight line L2 are axisymmetric with respect to a center line L0 passing through a center of the element body 10. The center line L0 is a straight line passing through the center of the element body 10 in the X direction. According to the above configuration, when viewed in the direction orthogonal to the first main surface 10*a*, the coil 20 can be symmetrical with respect to the center line L0 of the element body 10, thereby reducing the influence of leakage flux.

Preferably, as illustrated in FIGS. 2 and 3, the extended wiring layer of at least one of the first extended wiring 31 and the second extended wiring 32 is directly connected to at least one member of the coil wiring 21, the first outer electrode 41, and the second outer electrode 42. In the present embodiment, the extended wiring layers of the first extended wiring 31 are directly connected to the coil wiring 21 and the first outer electrode 41. The extended wiring layers of the second extended wiring 32 are directly connected to the coil wiring 21 and the second outer electrode 42. According to the above configuration, since a via layer is not provided for connecting the extended wiring layer and the member, the thickness of the inductor component can be reduced.

In this case, an overlap length between the extended wiring layer and the member directly connected to each other in the direction orthogonal to the first main surface 10*a* is preferably 1/10 or less of a thickness of the extended wiring layer. In the present embodiment, as illustrated in FIG. 3, the first extended wiring layer 321 of the second extended wiring 32 and the coil wiring 21 do not overlap each other in a direction orthogonal to the Z direction (e.g., the Y direction). Therefore, the overlap length between the first extended wiring layer 321 and the coil wiring 21 in the Z direction is 0, that is, 1/10 or less of the thickness of the first extended wiring layer 321.

Figure 5:
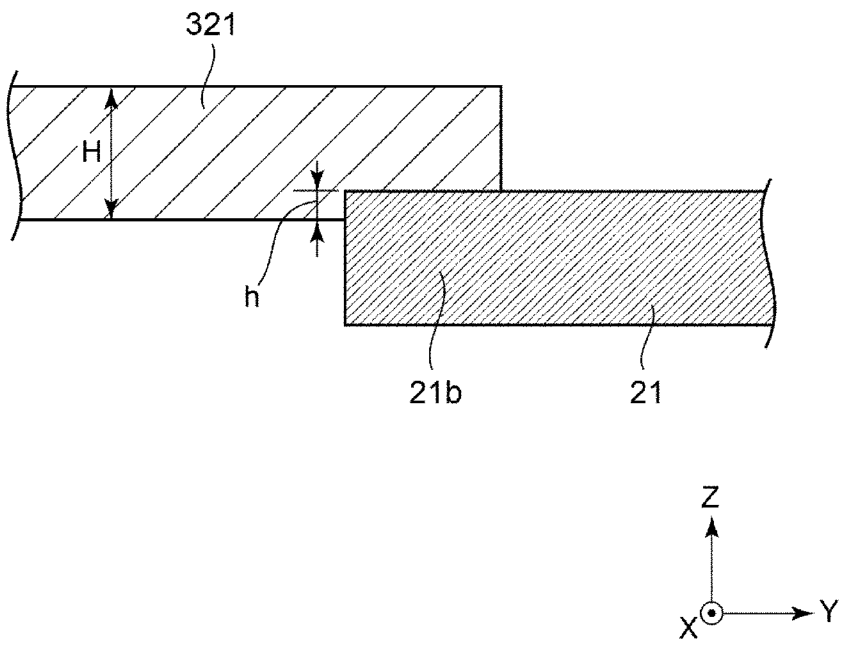
FIG. 5 is a cross-sectional view illustrating a state in which a first extended wiring layer and a coil wiring overlap each other in a Y direction.

Here, a case where the first extended wiring layer 321 and the coil wiring 21 overlap each other in the direction orthogonal to the Z direction will be described. FIG. 5 illustrates a state in which the first extended wiring layer 321 and the coil wiring 21 overlap each other in the Y direction. As illustrated in FIG. 5, an overlap length h between the first extended wiring layer 321 and the coil wiring 21 in the Z direction is 1/10 or less of a thickness H of the first extended wiring layer 321. According to the above configuration, since the overlap length h between the first extended wiring layer 321 and the coil wiring 21 is small, a distance between the second extended wiring layer 322 and the coil wiring 21 in the direction orthogonal to the first main surface 10*a* can be secured, thereby preventing a short circuit between the second extended wiring layer 322 and the coil wiring 21.

Preferably, as illustrated in FIGS. 2 and 3, in at least one of the first extended wiring 31 and the second extended wiring 32, the two extended wiring layers adjacent to each other in the direction orthogonal to the first main surface 10*a* are directly connected to each other. In the present embodiment, in all the extended wiring layers, two extended wiring layers adjacent to each other are directly connected. According to the above configuration, since a via layer is not provided for connecting the two extended wiring layers adjacent to each other, the thickness of the inductor component can be reduced. In this case, the overlap length between the two extended wiring layers adjacent to each other directly connected in the direction orthogonal to the first main surface 10*a* is preferably 1/10 or less of the thicknesses of the extended wiring layers.

Preferably, as illustrated in FIG. 2, when viewed in the direction orthogonal to the first main surface 10*a*, all the extended wiring layers do not overlap with each other except for end portions directly or indirectly connected in the extended wiring layers adjacent to each other in the direction orthogonal to the first main surface 10*a*. According to the above configuration, the region of the extended wiring layer can be reduced and the region of the magnetic material can be increased, thereby improving the inductance acquisition efficiency and the direct current superposition characteristics.

Manufacturing Method

Next, an example of a method for manufacturing the inductor component 1 will be described with reference to FIGS. 6A to 6K. FIGS. 6A to 6K are cross-sectional views corresponding to FIG. 3.

Figure 6A:
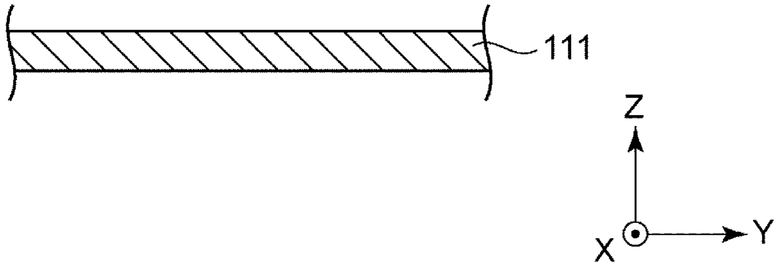
FIG. 6A is an explanatory diagram for explaining a method of manufacturing the inductor component.
Figure 6B:
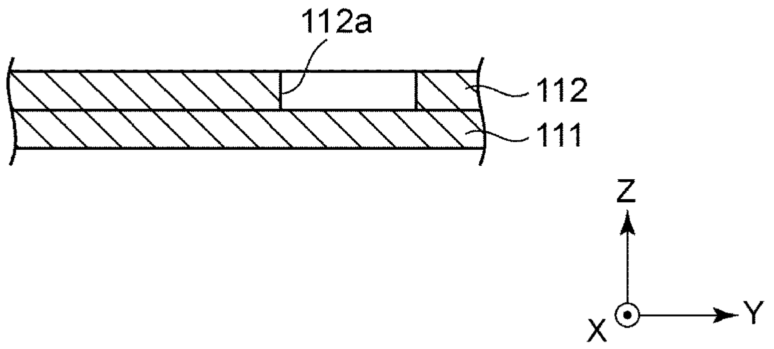
FIG. 6B is an explanatory diagram for explaining the method of manufacturing the inductor component.

As illustrated in FIG. 6A, a first magnetic material layer 111 is printed with a paste, and as illustrated in FIG. 6B, a second magnetic material layer 112 is printed with a paste on the first magnetic material layer 111. At this time, a hole 112*a* is provided in the second magnetic material layer 112.

Figure 6C:
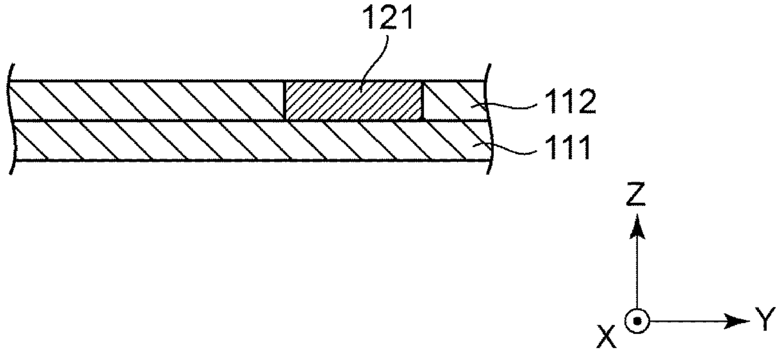
FIG. 6C is an explanatory diagram for explaining the method of manufacturing the inductor component.
Figure 6D:
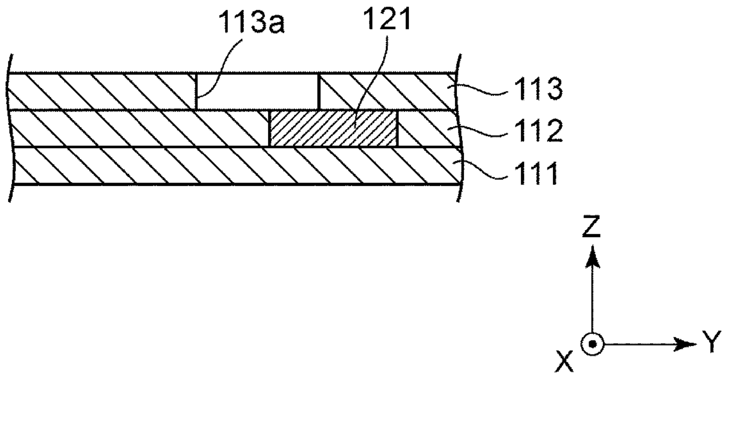
FIG. 6D is an explanatory diagram for explaining the method of manufacturing the inductor component.

As illustrated in FIG. 6C, a coil wiring material layer 121 is printed as a paste in the hole 112*a* of the second magnetic material layer 112, and as illustrated in FIG. 6D, a third magnetic material layer 113 is printed with a paste on the second magnetic material layer 112 and the coil wiring material layer 121. At this time, a hole 113*a* is provided in the third magnetic material layer 113 so that part of the coil wiring material layer 121 is exposed.

Figure 6E:
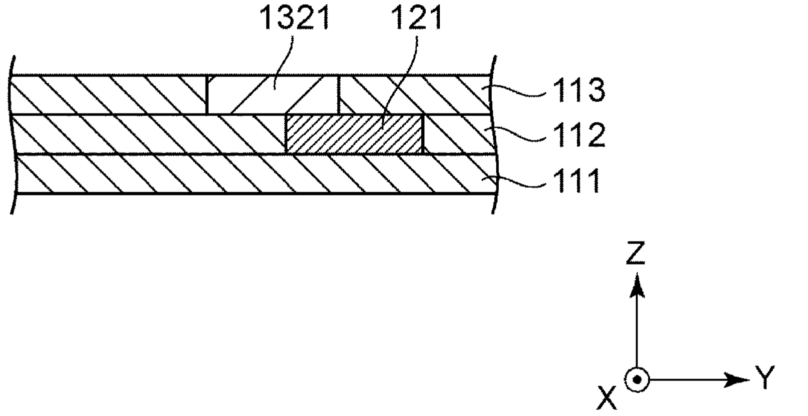
FIG. 6E is an explanatory diagram for explaining the method of manufacturing the inductor component.

As illustrated in FIG. 6E, a first extended wiring material layer 1321 is printed as a paste in the hole 113*a* of the third magnetic material layer 113. At this time, the first extended wiring material layer 1321 is laminated so that part of the first extended wiring material layer 1321 overlaps part of the coil wiring material layer 121.

Figure 6F:
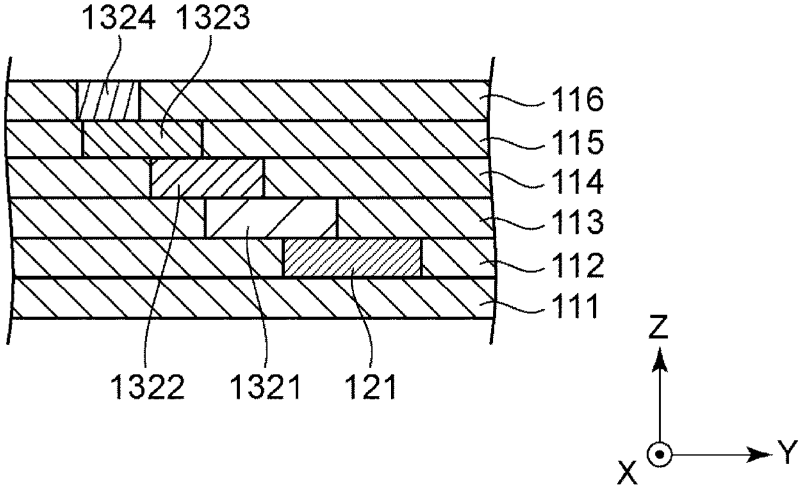
FIG. 6F is an explanatory diagram for explaining the method of manufacturing the inductor component.

Subsequently, the above process is repeated to form a multilayer body as illustrated in FIG. 6F by laminating a fourth magnetic material layer 114 and a second extended wiring material layer 1322, a fifth magnetic material layer 115 and a third extended wiring material layer 1323, and a sixth magnetic material layer 116 and a fourth extended wiring material layer 1324 in this order.

At this time, the second extended wiring material layer 1322 is laminated so that part thereof overlaps part of the first extended wiring material layer 1321, the third extended wiring material layer 1323 is laminated so that part thereof overlaps part of the second extended wiring material layer 1322, and the fourth extended wiring material layer 1324 is laminated so that part thereof overlaps part of the third extended wiring material layer 1323.

Figure 6G:
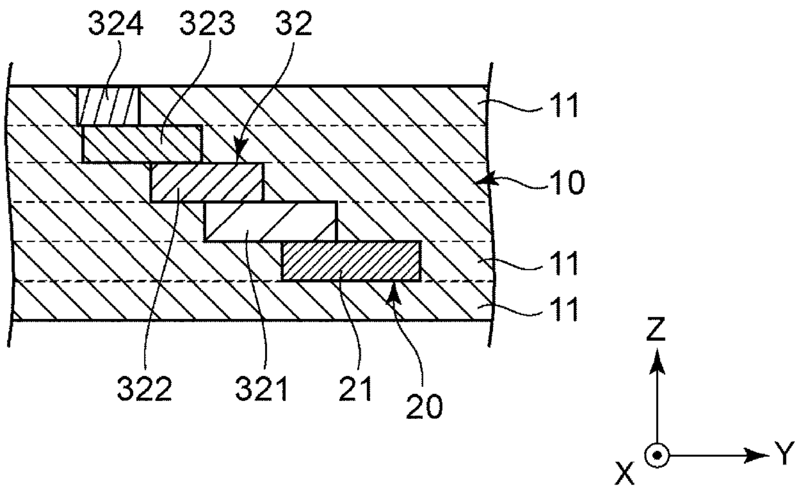
FIG. 6G is an explanatory diagram for explaining the method of manufacturing the inductor component.

As illustrated in FIG. 6G, the multilayer body is heat treated to pressure-bond the multilayer body. Thus, the first to sixth magnetic material layers 111 to 116 constitute the magnetic layers 11, respectively. The coil wiring material layer 121 constitutes the coil wiring 21. The first extended wiring material layer 1321 constitutes the first extended wiring layer 321, the second extended wiring material layer 1322 constitutes the second extended wiring layer 322, the third extended wiring material layer 1323 constitutes the third extended wiring layer 323, and the fourth extended wiring material layer 1324 constitutes the fourth extended wiring layer 324.

After pressure-bonding the multilayer body, heat treatment may be applied as necessary. In this way, sintering of the coil wiring material layer and the extended wiring material layers can be promoted, and unnecessary resin and solvent can be reliably removed. In addition, in order to increase the strength of the element body, resin coating or resin impregnation (immersing the substrate in resin) may be performed.

Figure 6H:
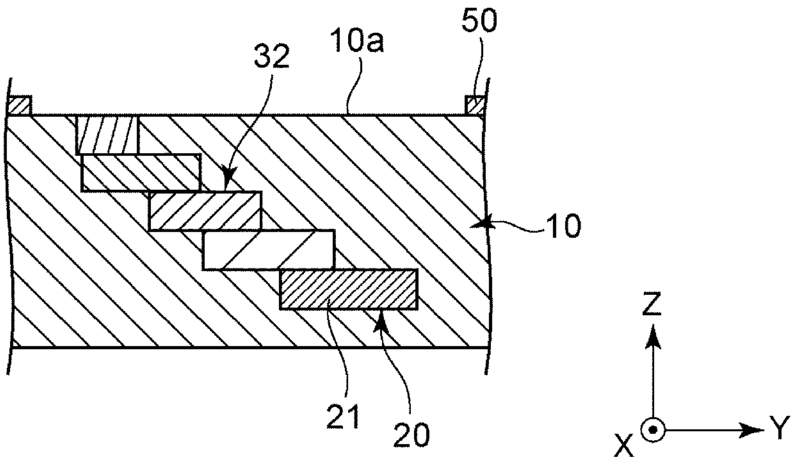
FIG. 6H is an explanatory diagram for explaining the method of manufacturing the inductor component.
Figure 6I:
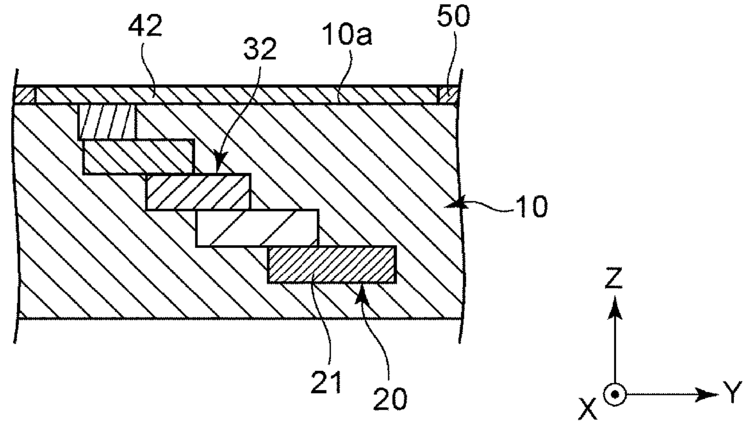
FIG. 6I is an explanatory diagram for explaining the method of manufacturing the inductor component.

As illustrated in FIG. 6H, the insulating film 50 is formed by printing as a paste in some region of the first main surface 10*a* of the element body 10, and as illustrated in FIG. 6I, the second outer electrode 42 is formed in a region of the first main surface 10*a* of the element body 10 not covered with the insulating film 50.

The second outer electrode 42 may be formed by a known method such as printing with a conductive paste, electroless plating, electrolytic plating, sputtering, or barrel plating. In the present embodiment, electroless plating Cu is formed in the region not covered with the insulating film 50, and Ni and Au are formed thereon by electroless plating. Here, a catalyst such as Pd may be used as necessary in order to improve initial deposition properties and adhesion between the plurality of conductive layers of the outer electrode.

Figure 6J:
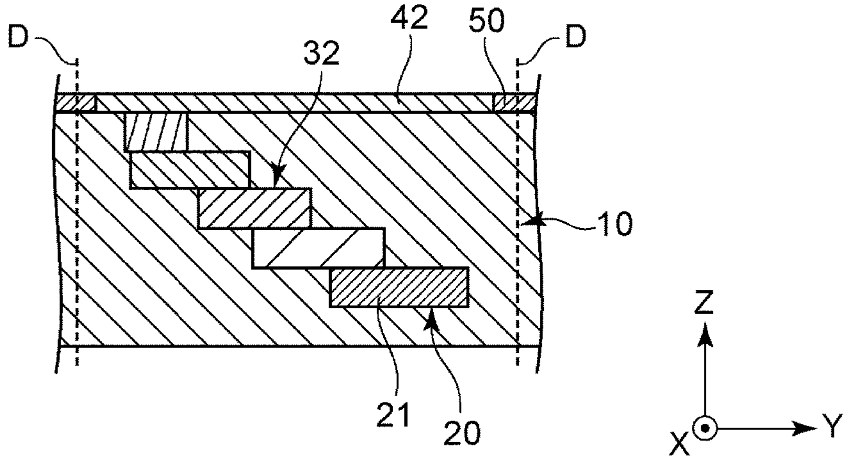
FIG. 6J is an explanatory diagram for explaining the method of manufacturing the inductor component.
Figure 6K:
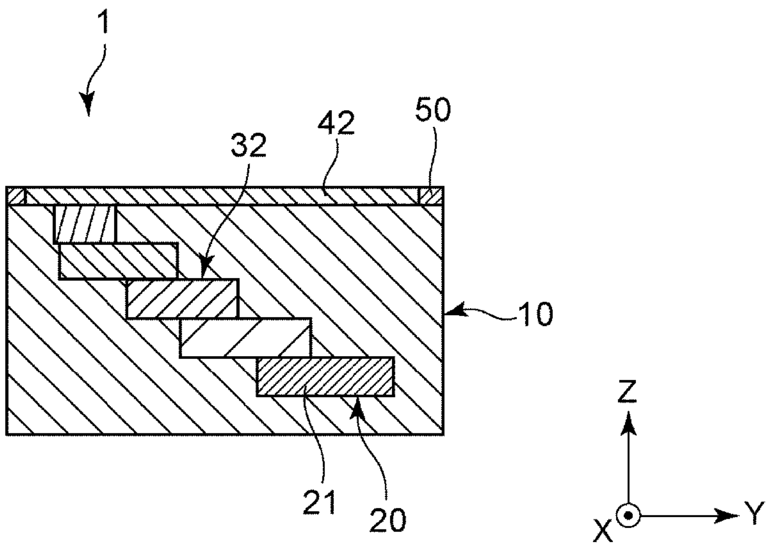
FIG. 6K is an explanatory diagram for explaining the method of manufacturing the inductor component.

Subsequently, as illustrated in FIG. 6J, the multilayer body is diced along cut lines D to obtain the inductor component 1 as illustrated in FIG. 6K. Note that the timing of dicing may be any timing, and for example, the outer electrode may be formed after dicing.

In the present embodiment, the element body is formed by printing and laminating magnetic materials, but for example, magnetic sheets may be laminated to form the element body. In order to adjust the thickness of the element body, grinding or polishing may be performed. In addition, the materials for the members may be adjusted, and after pressure bonding the multilayer body, firing may be performed at a high temperature of, for example, approximately 1000° C., instead of heat treatment.

Second Embodiment

Figure 7:
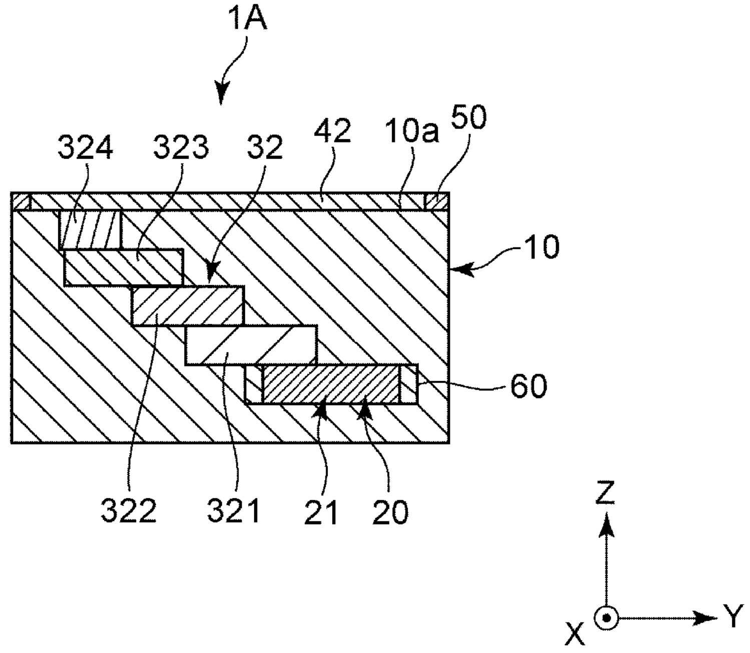
FIG. 7 is a cross-sectional view illustrating a second embodiment of an inductor component.

FIG. 7 is a cross-sectional view illustrating a second embodiment of an inductor component. FIG. 7 corresponds to the cross-sectional view taken along line A-A in FIG. 2. The second embodiment is different from the first embodiment in that an organic insulating resin is provided. This different configuration will be described below. Other configurations are the same as those of the first embodiment, and are denoted by the same reference signs as those of the first embodiment, and description thereof will be omitted.

As illustrated in FIG. 7, in an inductor component 1A of the second embodiment, a coil wiring 21 has a plurality of outer surfaces, and at least one surface of the plurality of outer surfaces is covered with an organic insulating resin 60. In the present embodiment, the coil wiring 21 has four outer surfaces in the cross section in FIG. 7. The outer surfaces of the coil wiring 21 at both sides in the Y direction are covered with the organic insulating resin 60. According to the above configuration, the insulation properties of the coil wiring 21 can be improved.

The material of the organic insulating resin 60 may be an epoxy-based resin, a polyimide-based resin, a phenol-based resin, an acrylic-based resin, a liquid crystal polymer-based resin, a combination thereof, a fluorine-based resin, or the like. The organic insulating resin 60 may contain magnetic powder such as silica, barium oxide, or ferrite. In this way, by enhancing the insulating properties, ESD resistance can be ensured even when the filling amount of the magnetic metal powder is increased. When a plurality of inductor components are included in an element body such as an inductor array, it is possible to suppress a short circuit between the plurality of inductor components. Further, by covering at least one of the outer surfaces of the coil wiring 21 with the organic insulating resin 60, it is possible to suppress a reduction in the amount of the magnetic material as much as possible.

Third Embodiment

Figure 8:
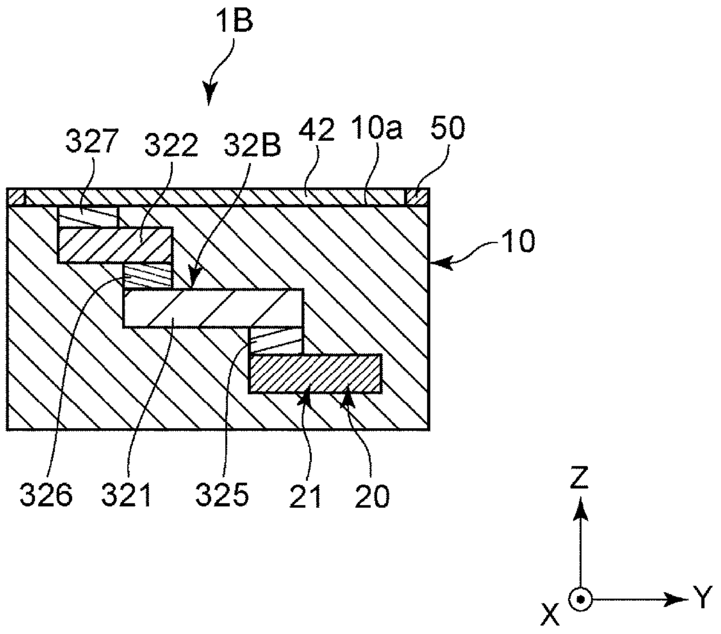
FIG. 8 is a cross-sectional view illustrating a third embodiment of an inductor component.

FIG. 8 is a cross-sectional view illustrating a third embodiment of an inductor component. The third embodiment is different from the first embodiment in the configuration of the extended wiring. This different configuration will be described below. Other configurations are the same as those of the first embodiment, and are denoted by the same reference signs as those of the first embodiment, and description thereof will be omitted.

As illustrated in FIG. 8, in an inductor component 1B of the third embodiment, a second extended wiring 32B includes a first extended wiring layer 321, a second extended wiring layer 322, a first via layer 325, a second via layer 326, and a third via layer 327. The first via layer 325, the first extended wiring layer 321, the second via layer 326, the second extended wiring layer 322, and the third via layer 327 are sequentially laminated in the Z direction.

The first via layer 325, the second via layer 326, and the third via layer 327 extend in a direction orthogonal to a first main surface 10*a*. A lower surface of the first via layer 325 is connected to a coil wiring 21. An upper surface of the first via layer 325 is connected to a first end of the first extended wiring layer 321. A lower surface of the second via layer 326 is connected to a second end of the first extended wiring layer 321. An upper surface of the second via layer 326 is connected to a first end of the second extended wiring layer 322. A lower surface of the third via layer 327 is connected to a second end of the second extended wiring layer 322. An upper surface of the third via layer 327 is connected to a second outer electrode 42.

According to the above configuration, the second extended wiring 32B includes the via layers connected to both ends of the extended wiring layer and extending in the Z direction, so heights of the via layers can be adjusted to adjust the inductor component to any thickness.

Preferably, the thicknesses of the via layers are thinner than the thickness of the coil wiring 21 and the thicknesses of the extended wiring layers. According to the above configuration, since the thicknesses of the via layers are thin, the coil length can be shortened, thereby improving the inductance acquisition efficiency.

Although the second extended wiring includes the via layers, it suffices that at least one of a first extended wiring and the second extended wiring includes via layers connected to both ends of the extended wiring layer and extending in the direction orthogonal to the first main surface.

Fourth Embodiment

Figure 9:
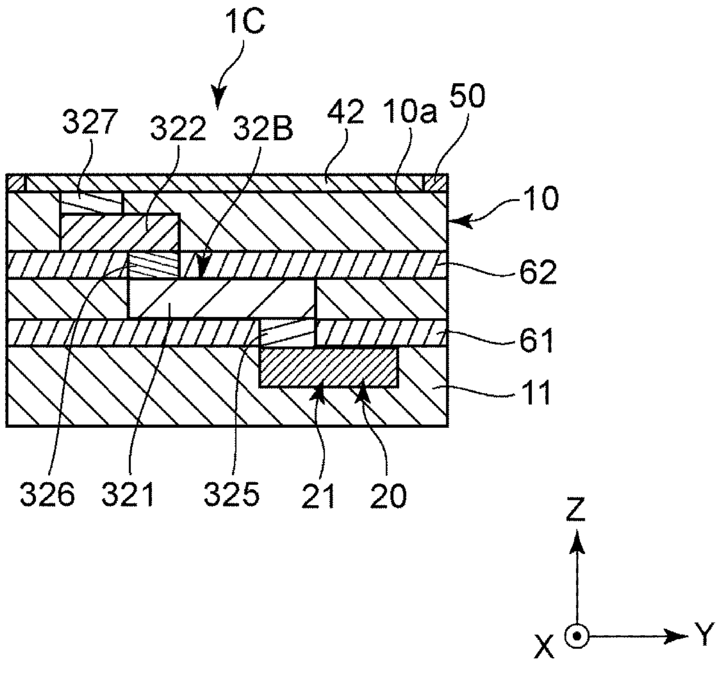
FIG. 9 is a cross-sectional view illustrating a fourth embodiment of an inductor component.

FIG. 9 is a cross-sectional view illustrating a fourth embodiment of an inductor component. The fourth embodiment is different from the third embodiment in that an insulating layer is provided. This different configuration will be described below. Other configurations are the same as those of the third embodiment, and are denoted by the same reference signs as those of the third embodiment, and description thereof will be omitted.

As illustrated in FIG. 9, in an inductor component 1C of the fourth embodiment, a coil wiring 21 and a second extended wiring 32B each have parallel surfaces parallel to a first main surface 10*a*, and at least one of the parallel surfaces of the coil wiring 21 and the second extended wiring 32B is covered with insulating layers 61 and 62. An insulation resistance of the insulating layers 61 and 62 is higher than an insulation resistance of the magnetic material of an element body 10. In the present embodiment, an upper surface of the coil wiring 21 and a lower surface of a first extended wiring layer 321 are covered with the first insulating layer 61, and an upper surface of the first extended wiring layer 321 and a lower surface of a second extended wiring layer 322 are covered with the second insulating layer 62. A first via layer 325 passes through the first insulating layer 61, and a second via layer 326 passes through the second insulating layer 62. According to the above configuration, a short circuit between wirings in a direction orthogonal to the first main surface 10*a* can be suppressed, thereby improving direct current superposition.

The material of the insulating layers 61 and 62 may be the same as the material of the organic insulating resin 60 of the second embodiment. Alternatively, the material of the insulating layers 61 and 62 may be a magnetic material having a lower magnetic permeability than the magnetic material of the element body 10. For example, magnetic metal powder finer than the magnetic material of the element body 10 may be used, magnetic metal powder having a thick surface coating or an oxide film may be used, a low-filling magnetic material may be used, or a combination thereof may be used.

The coil wiring, the first extended wiring, and the second extended wiring may each have parallel surfaces parallel to the first main surface, and at least one surface of the parallel surfaces of the coil wiring, the first extended wiring, and the second extended wiring may be covered with an insulating layer having a higher insulation resistance than the magnetic material of the element body.

Fifth Embodiment

Figure 10:
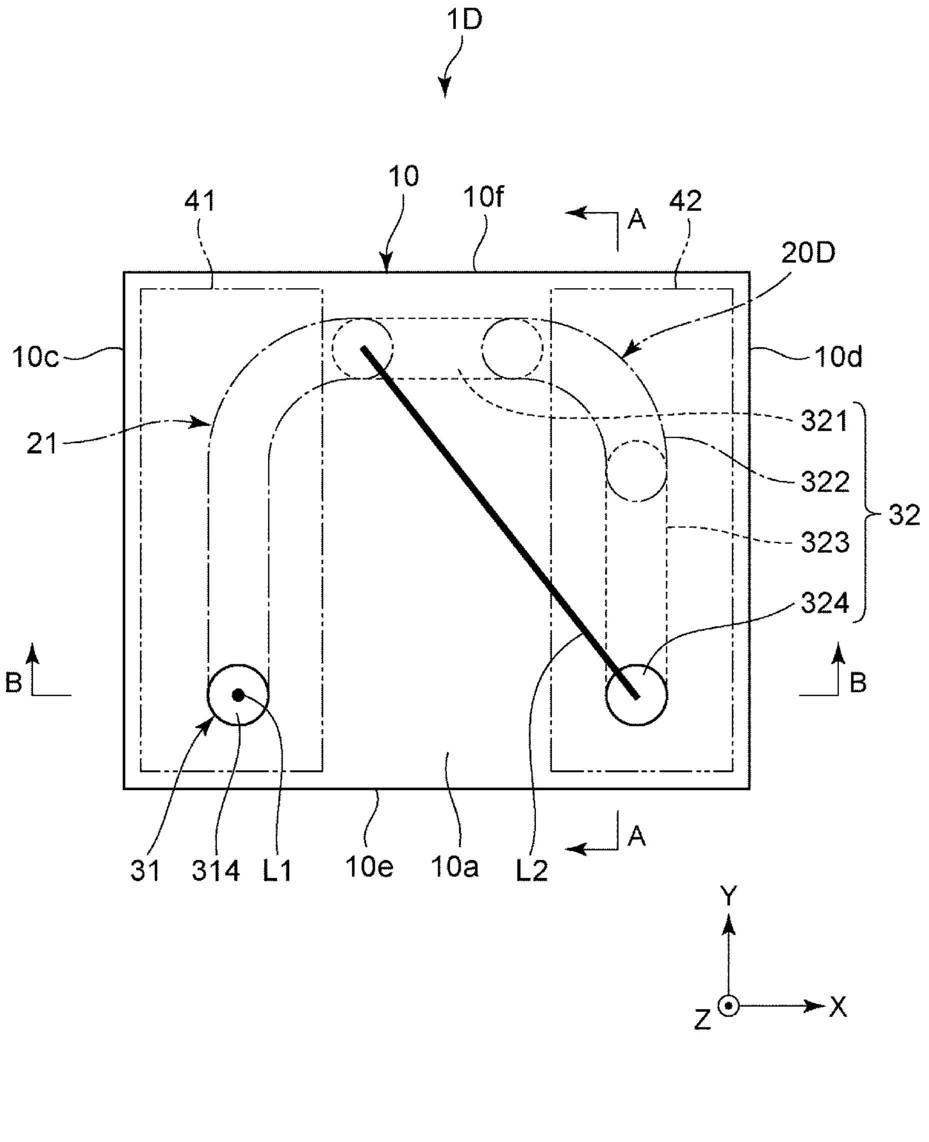
FIG. 10 is a plan view illustrating a fifth embodiment of an inductor component.
Figure 11:
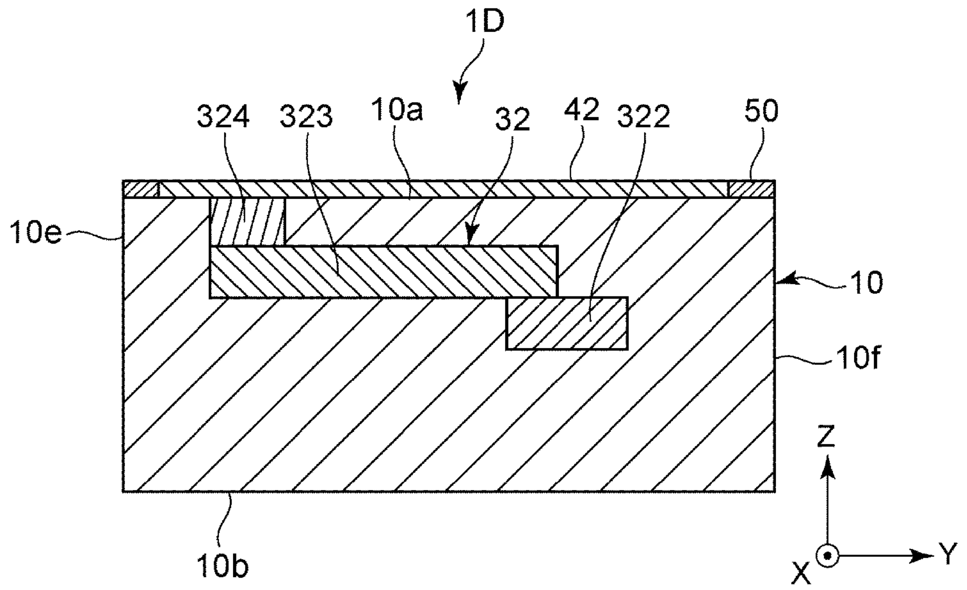
FIG. 11 is a cross-sectional view taken along line A-A in FIG. 10.
Figure 12:
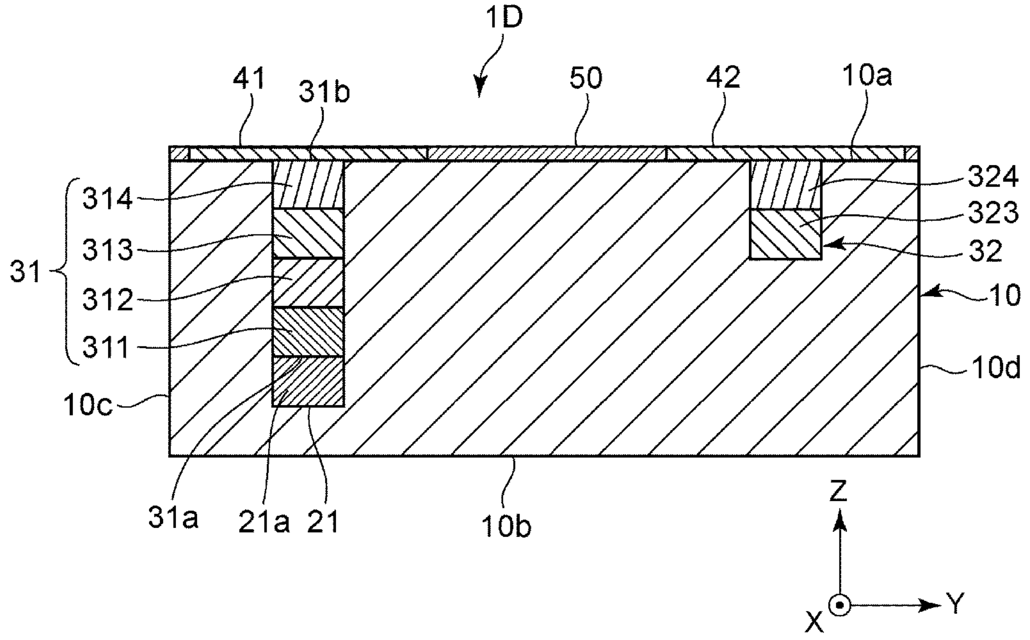
FIG. 12 is a cross-sectional view taken along line B-B in FIG. 10.
Figure 13:
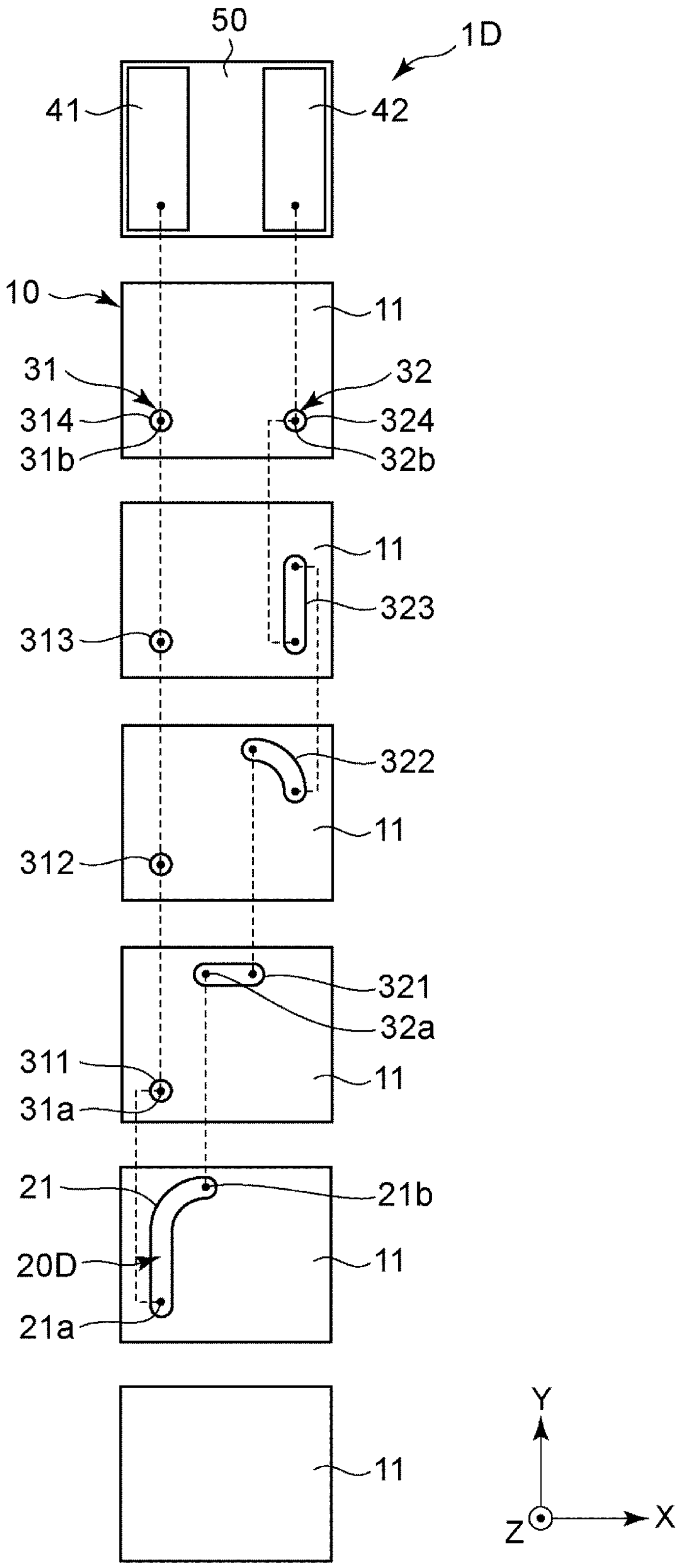
FIG. 13 is an exploded plan view of the inductor component.

FIG. 10 is a plan view illustrating a fifth embodiment of an inductor component. FIG. 11 is a cross-sectional view taken along line A-A in FIG. 10. FIG. 12 is a cross-sectional view taken along line B-B in FIG. 10. FIG. 13 is an exploded plan view of the inductor component. The fifth embodiment is different from the first embodiment in the configuration of the coil. This different configuration will be described below. Other configurations are the same as those of the first embodiment, and are denoted by the same reference signs as those of the first embodiment, and description thereof will be omitted.

As illustrated in FIGS. 10, 11, 12, and 13, in an inductor component 1D of the fifth embodiment, a coil 20D includes a coil wiring 21, a first extended wiring 31, and a second extended wiring 32. The coil wiring 21 is formed of a single layer with less than one turn extending in a direction parallel to a first main surface 10*a*.

The first extended wiring 31 is disposed in a layer different from the layer of the coil wiring 21. Specifically, the first extended wiring 31 is disposed in an upper layer of the coil wiring 21. The first extended wiring 31 is connected to a first end portion 21*a* of the coil wiring 21, and is extended toward the first main surface 10*a* and connected to a first outer electrode 41.

The second extended wiring 32 is disposed in a layer different from the layer of the coil wiring 21. Specifically, the second extended wiring 32 is disposed in an upper layer of the coil wiring 21, and is disposed in the same layer as the first extended wiring 31. The second extended wiring 32 is connected to a second end portion 21*b* of the coil wiring 21, and is extended toward the first main surface 10*a* and connected to a second outer electrode 42.

The first extended wiring 31 includes a first extended wiring layer 311, a second extended wiring layer 312, a third extended wiring layer 313, and a fourth extended wiring layer 314. The first extended wiring layer 311, the second extended wiring layer 312, the third extended wiring layer 313, and the fourth extended wiring layer 314 extend in a direction orthogonal to the first main surface 10*a* and are disposed in different layers from each other. Specifically, the first extended wiring layer 311, the second extended wiring layer 312, the third extended wiring layer 313, and the fourth extended wiring layer 314 are sequentially laminated in the Z direction, and are electrically connected to each other in series in this order. The first extended wiring layer 311, the second extended wiring layer 312, the third extended wiring layer 313, and the fourth extended wiring layer 314 all completely overlap with each other when viewed in the Z direction. Note that the first extended wiring layer 311, the second extended wiring layer 312, the third extended wiring layer 313, and the fourth extended wiring layer 314 may overlap with a slight shift when viewed in the Z direction.

The second extended wiring 32 includes a first extended wiring layer 321, a second extended wiring layer 322, a third extended wiring layer 323, and a fourth extended wiring layer 324. The first extended wiring layer 321, the second extended wiring layer 322, and the third extended wiring layer 323 each extend in the direction parallel to the first main surface 10*a*. The fourth extended wiring layer 324 extends in the direction orthogonal to the first main surface 10*a*. The first extended wiring layer 321, the second extended wiring layer 322, the third extended wiring layer 323, and the fourth extended wiring layer 324 are disposed in different layers from each other. Specifically, the first extended wiring layer 321, the second extended wiring layer 322, the third extended wiring layer 323, and the fourth extended wiring layer 324 are sequentially laminated in the Z direction, and are electrically connected to each other in series in this order. The first extended wiring layer 321 is disposed in the same layer as the first extended wiring layer 311, the second extended wiring layer 322 is disposed in the same layer as the second extended wiring layer 312, the third extended wiring layer 323 is disposed in the same layer as the third extended wiring layer 313, and the fourth extended wiring layer 324 is disposed in the same layer as the fourth extended wiring layer 314.

When viewed in the direction orthogonal to the first main surface 10*a*, all the extended wiring layers 311 to 314 and 321 to 324 have less than one turn. When viewed in the direction orthogonal to the first main surface 10*a*, a length of a center line of the coil wiring 21 is longer than a length of a center line of any of the extended wiring layers 311 to 314 and 321 to 324.

The first extended wiring 31 includes a first connection surface 31*a* connected to the first end portion 21*a* of the coil wiring 21 and a second connection surface 31*b* connected to the first outer electrode 41. A first straight line L1 connecting the first connection surface 31*a* and the second connection surface 31*b* is parallel to the direction orthogonal to the first main surface 10*a*. The second extended wiring 32 includes a third connection surface 32*a* connected to the second end portion 21*b* of the coil wiring 21 and a fourth connection surface 32*b* connected to the second outer electrode 42. A second straight line L2 connecting the third connection surface 32*a* and the fourth connection surface 32*b* is inclined to the direction orthogonal to the first main surface 10*a*.

According to the above configuration, the second straight line L2 is inclined to the direction orthogonal to the first main surface 10*a*, so that the magnetic flux density of the coil 20 can be brought close to even in the entire element body 10, and the low magnetic flux density region of the element body 10 can be reduced, thereby improving the inductance acquisition efficiency.

Note that the present disclosure is not limited to the above-described embodiments, and design can be changed without departing from the scope of the present disclosure. For example, the features of the first to fifth embodiments may be combined in various ways.

In the above embodiments, each of the first extended wiring and the second extended wiring is constituted of four extended wiring layers. However, at least one of the first extended wiring and the second extended wiring may be constituted of one extended wiring layer or a plurality of extended wiring layers other than the four layers.

In the above embodiments, the first straight line and the second straight line are inclined to the direction orthogonal to the first main surface. However, at least one of the first straight line and the second straight line may be inclined to the direction orthogonal to the first main surface.

In the above embodiments, the first outer electrode and the second outer electrode are provided only on the first main surface. However, at least one of the first outer electrode and the second outer electrode may be provided only on the second main surface, or may be provided on at least one of the first to fourth side surfaces in addition to the first main surface or the second main surface.

What is claimed is:

1. An inductor component comprising:

an element body containing a magnetic material and having a first main surface and a second main surface;

a coil in the element body and wound along an axis; and a first outer electrode and a second outer electrode on the element body and electrically connected to the coil, wherein the coil includes a coil wiring configured of a single layer with less than one turn extending in a direction parallel to the first main surface, a first extended wiring disposed in a layer different from the coil wiring, connected to a first end portion of the coil wiring, extended toward the first main surface or the second main surface, and connected to the first outer electrode, and a second extended wiring disposed in a layer different from the coil wiring, connected to a second end portion of the coil wiring, extended toward the first main surface or the second main surface, and connected to the second outer electrode, the first extended wiring includes only one extended wiring layer extending in the direction parallel to the first main surface or a plurality of extended wiring layers disposed in different layers and electrically connected in series with each other and extending in the direction parallel to the first main surface, and when viewed in a direction orthogonal to the first main surface, a length of a center line of the coil wiring is longer than a length of a center line of any of the extended wiring layers and all the extended wiring layers have less than one turn, and the first extended wiring includes a first connection surface connected to the coil wiring and a second connection surface connected to the first outer electrode, and a first straight line connecting the first connection surface and the second connection surface is inclined to the direction orthogonal to the first main surface.

2. The inductor component according to claim 1, wherein a number of turns of the coil wiring is larger than a number of turns of any of the extended wiring layers.

3. The inductor component according to claim 1, wherein the first straight line passes through an inside of the first extended wiring.

4. The inductor component according to claim 1, wherein an inclination angle of the first straight line to the direction orthogonal to the first main surface is 10° to 45°.

5. The inductor component according to claim 1, wherein the element body contains magnetic metal powder of FeSi, a particle size D50 of the magnetic metal powder is 10 μm or less, and a particle size D90 of the magnetic metal powder is 15 μm or less.

6. The inductor component according to claim 1, wherein a length of the first straight line is at least five times a thickness of the coil wiring.

7. The inductor component according to claim 1, wherein a porosity of the coil wiring is smaller than a porosity of the element body.

8. The inductor component according to claim 1, wherein a porosity of the coil wiring is larger than a porosity of the element body.

9. The inductor component according to claim 1, wherein each of the first outer electrode and the second outer electrode is only at the first main surface or only at the second main surface, and includes a plurality of conductive layers.

10. The inductor component according to claim 1, wherein the first extended wiring and the second extended wiring are in direct contact with the element body.

11. The inductor component according to claim 1, wherein the coil wiring has a plurality of outer surfaces, and at least one surface of the plurality of outer surfaces is covered with an organic insulating resin.

12. The inductor component according to claim 1, wherein the coil wiring, the first extended wiring, and the second extended wiring each have parallel surfaces parallel to the first main surface, and at least one parallel surface of the parallel surfaces of the coil wiring, the first extended wiring, and the second extended wiring is covered with an insulating layer having a higher insulation resistance than the magnetic material of the element body.

13. The inductor component according to claim 1, wherein the first extended wiring includes via layers connected to both ends of the extended wiring layer and extending in the direction orthogonal to the first main surface.

14. The inductor component according to claim 13, wherein thicknesses of the via layers are thinner than the thickness of the coil wiring and a thickness of the extended wiring layer.

15. The inductor component according to claim 1, wherein the second extended wiring includes a third connection surface connected to the coil wiring and a fourth connection surface connected to the second outer electrode, and a second straight line connecting the third connection surface and the fourth connection surface is inclined to the direction orthogonal to the first main surface.

16. The inductor component according to claim 15, wherein when viewed in the direction orthogonal to the first main surface, the first straight line and the second straight line are axisymmetric with respect to a center line passing through a center of the element body.

17. The inductor component according to claim 1, wherein the extended wiring layer of the first extended wiring is directly connected to at least one member of the coil wiring and the first outer electrode.

18. The inductor component according to claim 17, wherein an overlap length in the direction orthogonal to the first main surface between the extended wiring layer and the member directly connected to each other is 1/10 or less of a thickness of the extended wiring layer.

19. The inductor component according to claim 1, wherein the first extended wiring includes the plurality of extended wiring layers, and when viewed in the direction orthogonal to the first main surface, the plurality of extended wiring layers do not overlap except for end portions directly or indirectly connected in extended wiring layers adjacent to each other in the direction orthogonal to the first main surface.

20. The inductor component according to claim 2, wherein the first straight line passes through an inside of the first extended wiring.

21. The inductor component according to claim 1, wherein the coil wiring has less than one turn.

* * * * *